US005983489A

United States Patent [19]

Jee

[11] Patent Number: 5,983,489

[45] Date of Patent: Nov. 16, 1999

[54] TERMINAL COUPLING PLIERS

[75] Inventor: Beam-Chi Jee, Taipei Hsien, Taiwan

[73] Assignee: Hanlong Industrial Co., Ltd., Taipei Hsien, Taiwan

[21] Appl. No.: 09/019,433

[22] Filed: Feb. 5, 1998

[51] Int. Cl.[6] .............................. B23P 19/02; B25B 7/02

[52] U.S. Cl. .............................. 29/751; 29/753; 29/758; 72/409.14; 81/313; 81/355

[58] Field of Search .............................. 29/750, 751, 753, 29/758, 268, 33 M, 280; 72/409.14; 81/355, 356, 357, 313, 314

[56] References Cited

U.S. PATENT DOCUMENTS

| | | | |
|---|---|---|---|
| 3,322,008 | 5/1967 | Filia | 81/313 |
| 3,571,888 | 3/1971 | Di Filippo | 29/751 |
| 3,837,211 | 9/1974 | Gress et al. | 29/751 |
| 4,742,737 | 5/1988 | Hatfield | 81/355 |
| 5,094,097 | 3/1992 | Tooth et al. | 29/751 |
| 5,138,864 | 8/1992 | Tarpill | 29/751 |
| 5,392,508 | 2/1995 | Holiday et al. | 29/751 |
| 5,435,167 | 7/1995 | Holiday et al. | 29/751 |
| 5,596,800 | 1/1997 | Holiday et al. | 72/409.14 |

*Primary Examiner*—Lee Young
*Assistant Examiner*—A. Dexter Tugbang
*Attorney, Agent, or Firm*—Bacon & Thomas

[57] ABSTRACT

A terminal coupling pliers comprises a guiding block, a primary molding portion, and a secondary molding portion on the front side of a primary hand-grip, and cone-shaped grooves on the adjacent surface of the primary molding portion and the secondary molding portion, a secondary hand-grip pivoted on the central portion of the primary hand-grip, and a pushing block pivoted on the front side of the secondary hand-grip and being arranged within the guiding block wherein the pushing block having a terminal insertion hole on front side thereof. The pushing block can move toward the cone-shaped grooves as the primary and secondary hand-grips are pushed closely. During its application, the junction of the terminal coupled with the signal line is enclosed with a ring and inserted into the terminal insertion hole. By closing the primary hand-grip and the secondary hand-grip, the ring will be pushed, deformatively by the pushing block, against the molding hole to lock the terminal and the signal line firmly.

2 Claims, 5 Drawing Sheets

TERMINAL COUPLING PLIERS

FIELD OF THE UTILITY

The present utility relates to a terminal coupling pliers and, more particularly, to a terminal coupling pliers by which a terminal can be coupled to a signal line firmly and quickly without the problem of terminal detachment and permeation of mist.

BACKGROUND OF THE UTILITY

The present means to couple a signal line to a TV terminal is to use a ring surrounding and locking the junction portion of the terminal and the signal line.

More particularly, by removing the insulation layer of the signal line, the conductive wires of the signal line will be exposed and then connected electrically to that of the terminal. Afterward, a ring with larger diameter is used to surround the junction portion of the terminal and the signal line, and then squeezed by a pliers to lock the junction portion.

However, the coupling method of the terminal and the signal line has the following disadvantages:

1. The ring cannot lock the junction portion of the terminal and the signal line enclosed by it firmly even after being squeezed by a pliers such that the permeated mist may influence the signal quality.
2. The ring is hard to be placed exactly on the junction portion of the terminal and the signal line.
3. The force exerted on the ring by the pliers should control carefully, an excessive force might damage the insulation layer and a deficient force might cause detachment of terminal from the signal line.

SUMMARY OF THE UTILITY

It is an object of the present utility to provide a terminal coupling pliers comprising a guiding block, a primary molding portion, and a secondary molding portion on the front side of a primary hand-grip, and cone-shaped grooves on the adjacent surface of the primary molding portion and the secondary molding portion, a secondary hand-grip pivoted on the central portion of the primary hand-grip, and a pushing block pivoted on the front side of the secondary hand-grip and being arranged within the guiding block wherein the pushing block having a terminal insertion hole on front side thereof. The pushing block can move toward the cone-shaped grooves as the primary and secondary hand-grips are pushed closely. During its application, the junction of the terminal coupled with the signal line is enclosed with a ring and inserted into the terminal insertion hole. By closing the primary hand-grip and the secondary hand-grip, the ring will be pushed, deformatively by the pushing block, against the molding hole to lock the terminal and the signal line firmly.

It is another object of the present utility to provide a terminal coupling pliers wherein the fixed stroke of the terminal insertion hole, as the primary and the secondary hand-grip are closed, couples the terminal and the signal line firmly and with uniform quality.

BRIEF DESCRIPTION OF THE DRAWINGS

In order to better understand the present utility, reference should be made to the following detailed description taken in junction with the accompanying drawings wherein.

DETAIL DESCRIPTION OF THE PREFERRED EMBODIMENT

Figure 1:
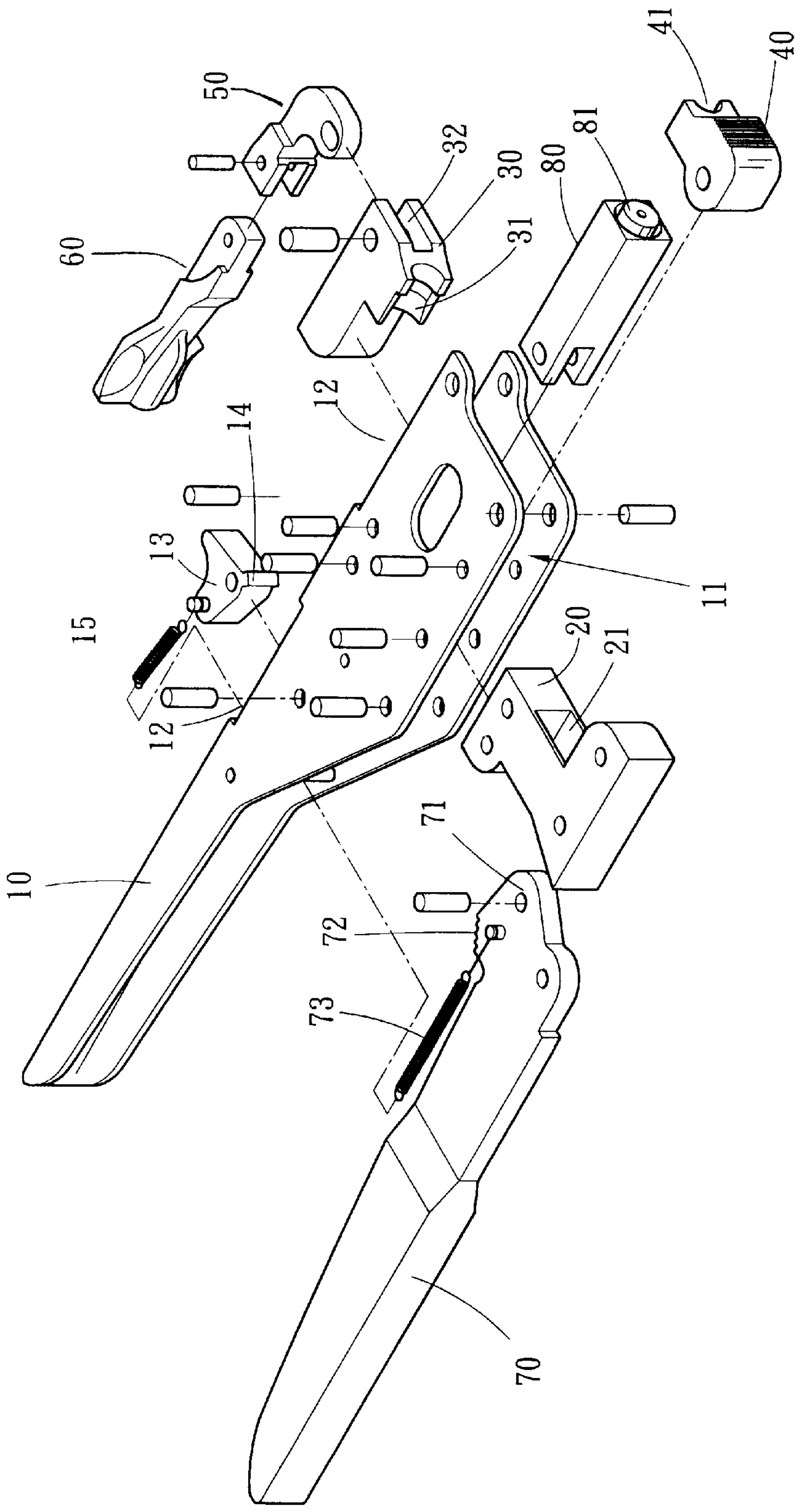
FIG. 1 shows the exploded view of the present utility.

As shown in FIG. 1, the terminal coupling pliers according to the present utility comprises:

- a primary hand-grip 10 wherein the front end thereof is provided with a hollow portion 11, grooves 12 are provided beside the hollow portion 11, a locking portion 13 corresponding to one of those grooves 12 is arranged on the rear side of the hollow portion 11 with one end having a tenon 14 and another end connected to the primary hand-grip 10 through a spring 15;
- a guiding piece 20 fixed on the central portion of the hollow portion 11 with a guiding groove 21 on the center thereof;
- a primary molding portion 30 pivoted on one side of the front end of the hollow portion 11 and having a primary cone-shaped groove 31, tapering in forward direction, on inner side thereof and a pivoting groove 32 on outer side thereof;
- a secondary molding portion 40 pivoted on another side of the front end of the hollow portion 11 opposite to the primary molding portion 30, and being able to pivot outward, moreover, the secondary molding portion 40 also having, on the surface adjacent to that of the primary molding portion 30, a secondary cone-shaped groove 41, tapering in forward direction and forming a molding hole as approaching to the primary cone-shaped groove 31;
- a pivoting shaft 50 arranged within the pivoting groove 32 on outer side of the primary molding portion 30;
- a trigger 60 arranged on end side of the pivoting shaft 50 with bottom contacting the outer surface of the primary molding portion 30 to pivot the primary molding portion 30;
- a secondary hand-grip 70 pivoting on the rear side of the hollow portion 11 and having a connecting portion 71 inner to the pivoting point thereof, as the secondary hand-grip 70 move relatively to the primary hand-grip 10, the connecting portion 71 will move forward and backward, moreover, one end of the connecting portion 71 having a plurality of clamping teeth 72 corresponding to the tenon 14 of the locking piece 13, and another end of the connecting portion 71 connected to the primary hand-grip 10 through a spring 15 such that the primary hand-grip 10 and the secondary hand-grip 70 can be kept close as not in use;
- a pushing block 80 pivoted on the connecting portion 71 at the front side of the secondary hand-grip 70 and being arranged within the guiding groove 21 of the guiding block 20, the pushing block 80 having a terminal insertion hole 81 on front side thereof corresponding to the molding hole formed by the cone-shaped grooves 31 and 41 as the primary molding portion 30 and the secondary molding portion 40 approach to each other.

Figure 2:
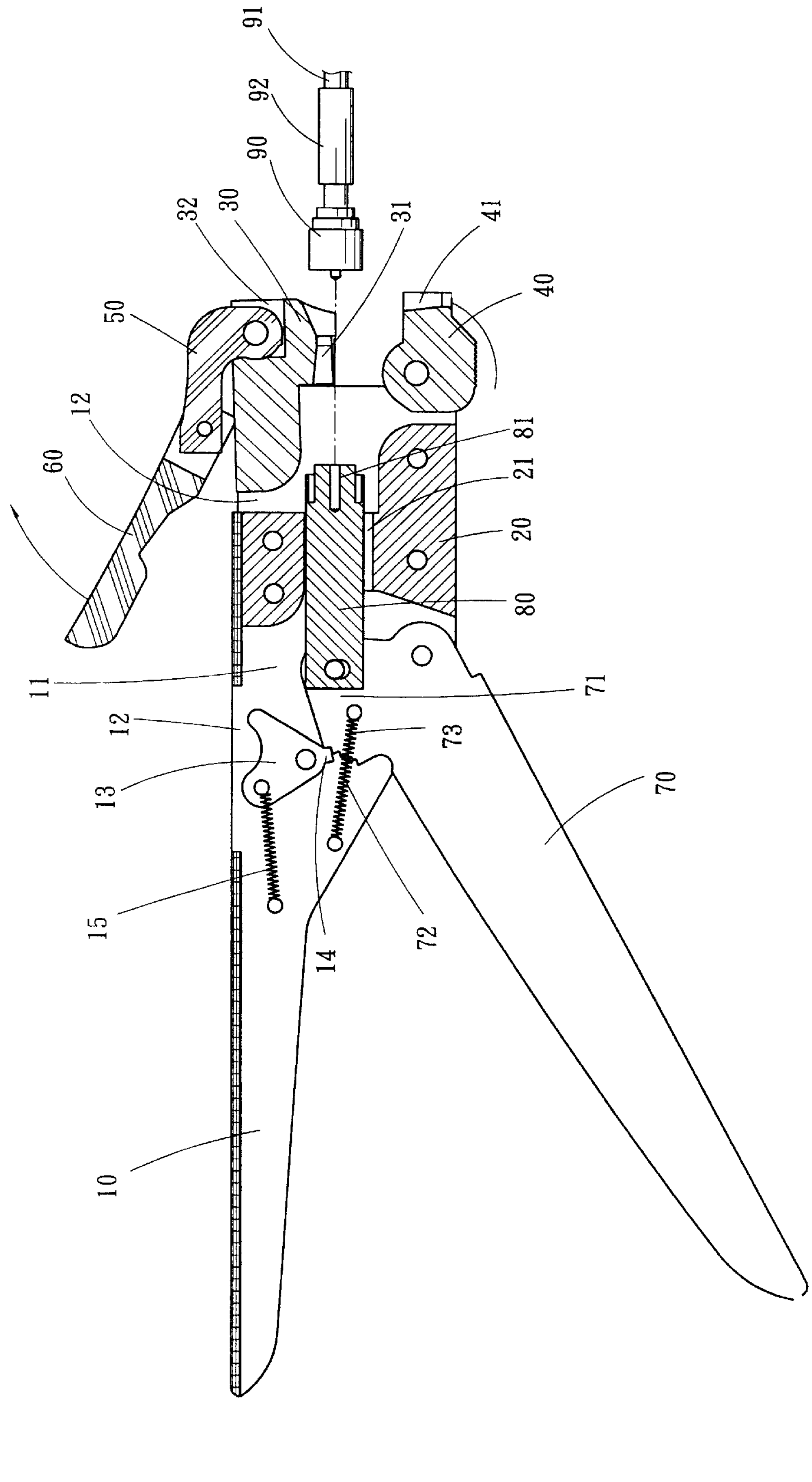
FIGS. 2, 3 and 4 show the coupling process of terminal and signal line by the pliers of the present utility.
Figure 3:
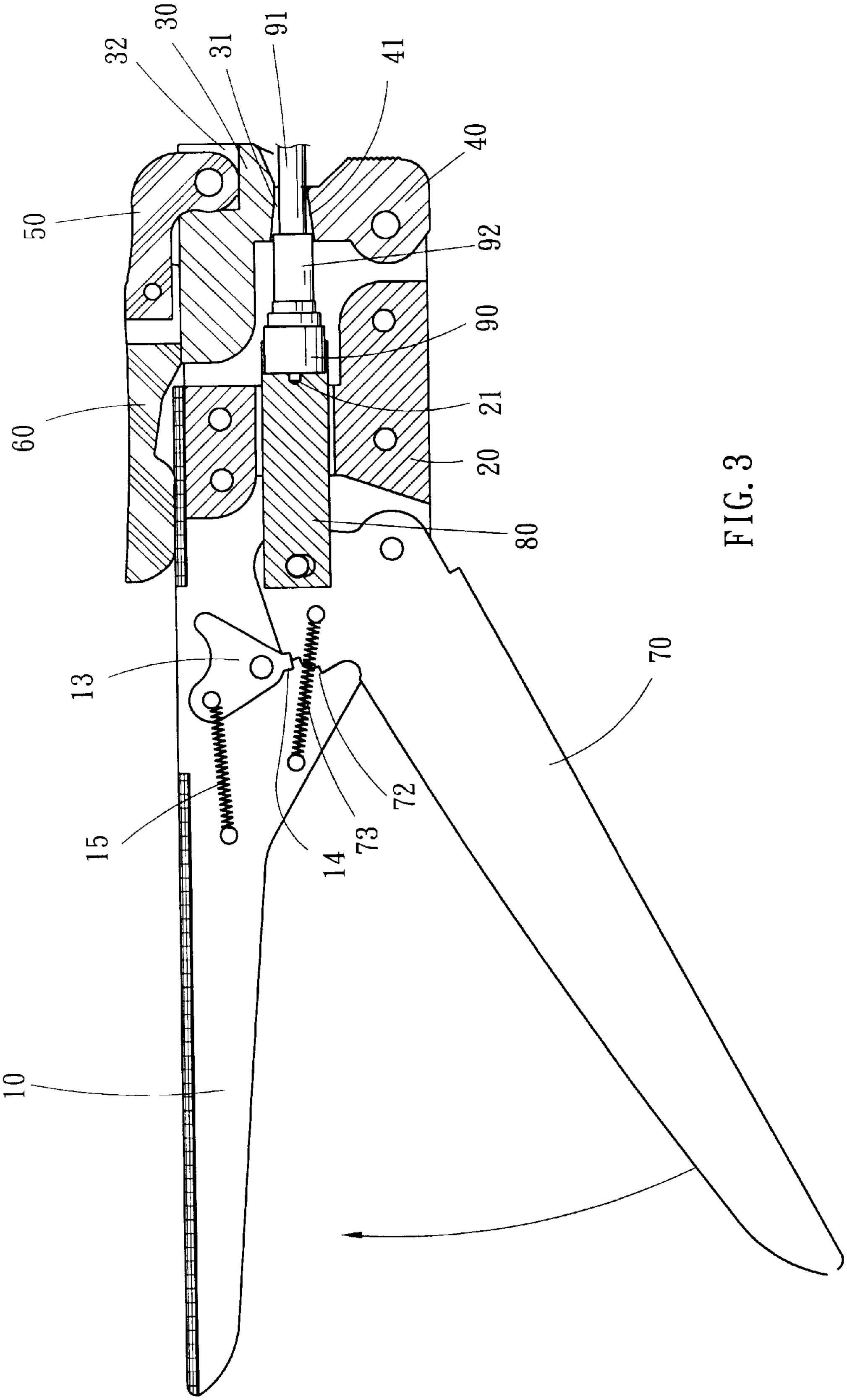
Figure 4:
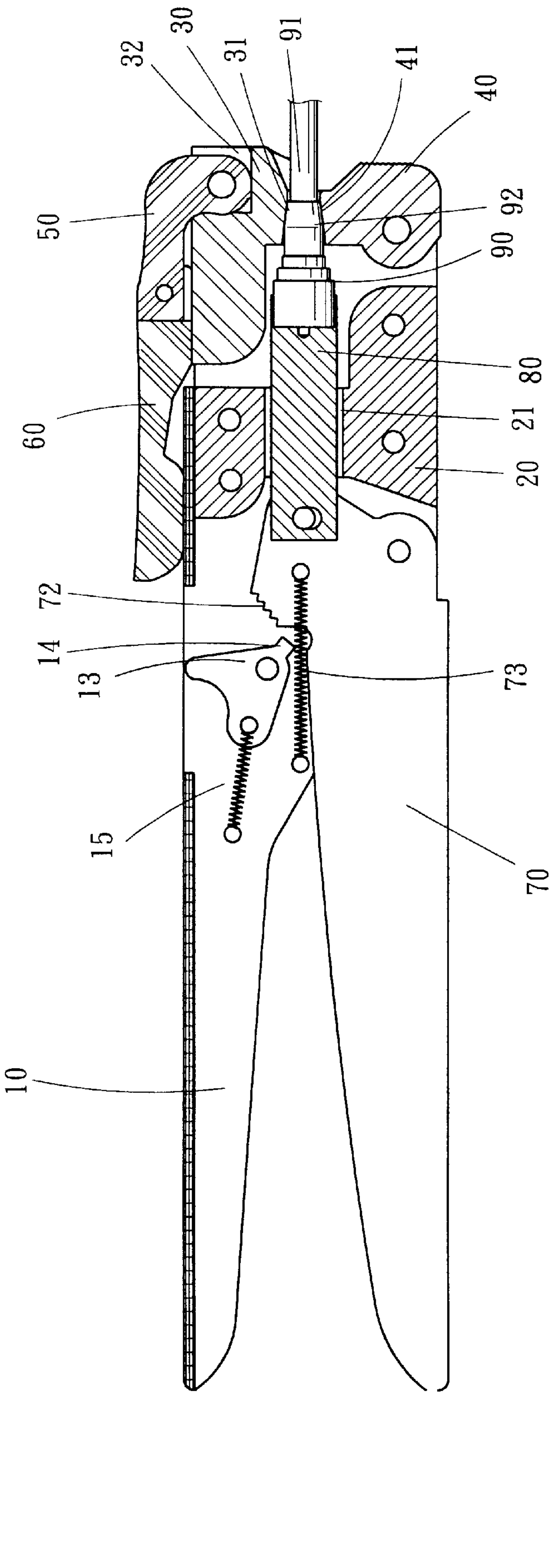
Figure 5:
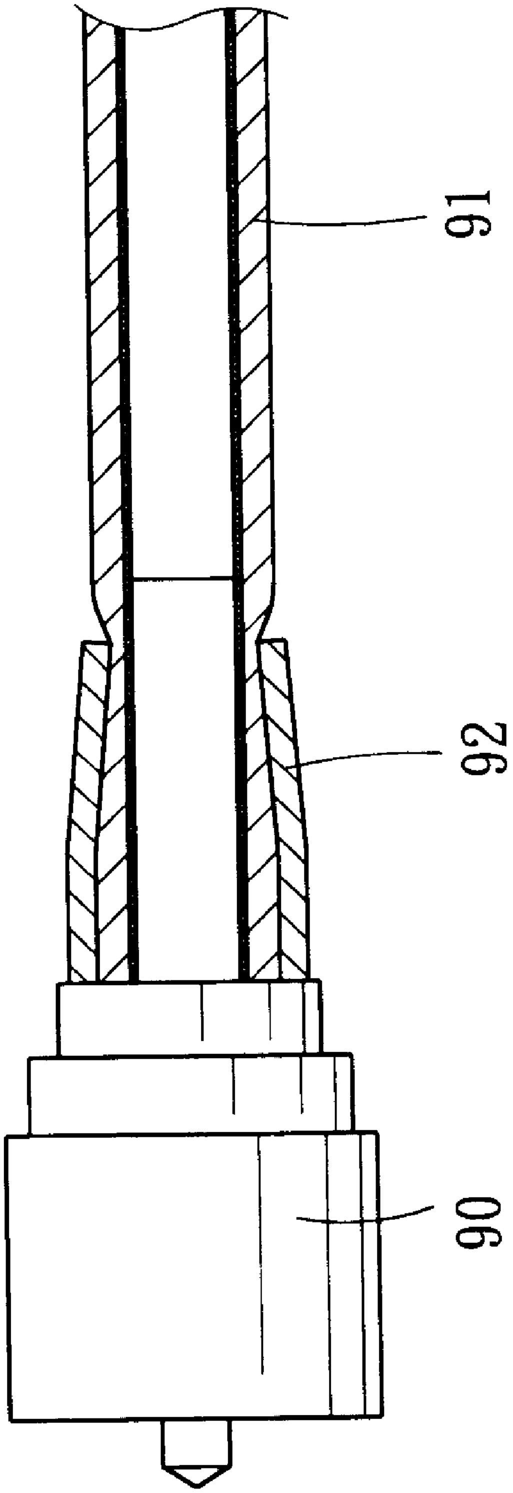
FIG. 5 is the terminal and the signal line after being coupled by the pliers of the present utility.

As shown in FIG. 2, after assembling all components described above, by opening the primary hand-grip 10 and the secondary hand-grip 70, pushing outward the primary molding portion 30 with the trigger 60 and pushing outward the secondary molding portion 40, the molding hole can be opened. Meanwhile, the terminal 90 is coupled with the signal line 91 and the junction portion thereof is enclosed with a ring 92. Afterward, the terminal 90 with ring 92 surrounding is inserted into the terminal insertion hole 81. As shown in FIG. 3, the secondary molding portion 40 is pushed inward such that the secondary cone-shaped groove 41 is clamped with the terminal insertion hole 81. Afterward, the trigger 60 is suppressed to bring the primary molding portion 30 closer to the secondary molding portion 40 and to form a molding hole between the cone-shaped grooves 31 and 41. As shown in FIG. 4, the pushing block 80 can be pushed forward by closing the primary hand-grip 10 and the secondary hand-grip 70, the ring 92 will be pushed deformatively against the molding hole between the cone-shaped grooves 31 and 41 to lock the terminal 90 and the signal line 91 firmly. Afterward, the primary molding portion 30 and the secondary molding portion 40 are pushed outward to release the coupled terminal 90 and signal line 91. The ring 92 can be moved automatically to the junction of the terminal 90 and signal line 91 as pushed by the pushing block 80 without detachment of the terminal 90 and the permeation of mist. Therefore the terminal coupling pliers provided by the present utility can enhance the coupling quality and processing efficiency of terminal coupling work.

As shown in FIGS. 2 and 3, to insert the terminal 90 into the terminal insertion hole 81 smoothly, the locking piece 13 will lock the tenon 14 to the tooth 72 of the secondary hand-grip 70 with the elastic force of the spring 15. Therefore, the locking piece 13 can lock the primary hand-grip 10 and the secondary hand-grip 70 to be in an open state while pushing of the locking piece 13 can unlock the state.

While this utility has been described in connection with what is presently considered to be the most practical and preferred embodiment, it is to be understood that the utility is not limited to the disclosed embodiment and has various modifications. Therefore, the present utility is intended to cover various modifications and equivalent arrangements included within the spirit and scope of the appended claims.

I claim:

1. A terminal coupling pliers, comprising:

a primary hand-grip (10) with a hollow portion (11) provided in a front end thereof;

at least one groove (12) provided beside the hollow portion (11);

a guiding piece (20) fixed on a central portion of the hollow portion (11);

a guiding groove (21) provided in a center of the guiding piece (20);

a primary molding portion (30) pivotally attached on one side of a front end of the hollow portion (11);

a primary cone-shaped groove (31) formed on an inner side of the primary molding portion (30), the primary cone-shaped groove (31) tapering in a forward direction;

a pivoting groove (32) formed on an outer side of the primary molding portion (30);

a pivoting shaft (50) arranged within the pivoting groove (32);

a trigger (60) arranged on an end of the pivoting shaft (50) so that movement of the trigger (60) pivots the primary molding portion (30);

a secondary molding portion (40) pivotally attached on another side of the front end of the hollow portion (11) opposite of the primary molding portion (30);

a secondary cone-shaped groove (41) formed on an inner side of the secondary molding portion (40), the secondary cone-shaped groove (41) tapering in a forward direction, the primary and secondary cone-shaped grooves (31, 41) forming a molding hole when positioned adjacent each other;

a secondary hand-grip (70) pivotally attached on a rear side of the hollow portion (11) at a pivoting point, the secondary hand-grip (70) having a connecting portion (71) disposed inwardly of the pivoting point;

a spring (72) connecting the primary hand-grip (10) to the connecting portion (71) of the secondary hand-grip (70);

a pushing block (80) pivotally attached on a forward end of the connecting portion (71) and arranged to move within the guiding groove (21) of the guiding piece (20); and a terminal insertion hole (81) disposed on a front end of the pushing block (80), the terminal insertion hole (81) being aligned with the molding hole formed when the primary and secondary cone-shaped grooves (31, 41) are positioned adjacent each other.

2. A terminal coupling pliers according to claim 1, further comprising:

a locking piece (13) pivotally attached on the primary hand-grip (10) on the rear side of the hollow portion (11);

a tenon (14) provided on one end of the locking piece (13); and a plurality of teeth (72) provided on the connecting portion (71) of the secondary hand-grip (70);

wherein the locking piece (13) is pivoted to move the tenon (14) into and out of engagement with at least one of the teeth (72) to lock and unlock the secondary hand-grip (70).

* * * * *